US010605990B2

(12) United States Patent
Vallance et al.

(10) Patent No.: US 10,605,990 B2
(45) Date of Patent: Mar. 31, 2020

(54) TENSIONING DEVICE HAVING A FLEXURE MECHANISM FOR APPLYING AXIAL TENSION TO CLEAVE AN OPTICAL FIBER AND METHOD

(71) Applicant: NANOPRECISION PRODUCTS, INC., El Segundo, CA (US)

(72) Inventors: Robert Ryan Vallance, Newbury Park, CA (US); Eric Marsh, State College, PA (US)

(73) Assignee: CUDOQUANTA FLORIDA, INC., Sarasota, FL (US)

( * ) Notice: Subject to any disclaimer, the term of this patent is extended or adjusted under 35 U.S.C. 154(b) by 721 days.

(21) Appl. No.: 14/857,757

(22) Filed: Sep. 17, 2015

(65) Prior Publication Data

US 2016/0187583 A1  Jun. 30, 2016

Related U.S. Application Data

(60) Provisional application No. 62/051,830, filed on Sep. 17, 2014.

(51) Int. Cl.
*G02B 6/25* (2006.01)
*B26D 7/14* (2006.01)
(Continued)

(52) U.S. Cl.
CPC ............... *G02B 6/25* (2013.01); *B26D 7/14* (2013.01); *B26F 3/002* (2013.01); *C03B 37/16* (2013.01);
(Continued)

(58) Field of Classification Search
CPC .... B26F 3/02; G02B 6/25; B26D 3/08; B26D 7/14; Y10T 225/12; Y10T 225/321; Y10T 225/325; Y10T 225/357
(Continued)

(56) References Cited

U.S. PATENT DOCUMENTS

| 4,017,013 A | * | 4/1977 | Hawk et al. | G02B 6/25 225/101 |
| 4,039,309 A | * | 8/1977 | Albanese et al. | G02B 6/25 225/101 |

(Continued)

FOREIGN PATENT DOCUMENTS

| JP | H0780798 | 3/1995 |
| JP | 2012-8472 | * 1/2012 |

OTHER PUBLICATIONS

International Search Report of Counterpart PCT International Application No. PCT/US2015/050815.

(Continued)

*Primary Examiner* — Clark F Dexter
(74) *Attorney, Agent, or Firm* — Liu & Liu

(57) ABSTRACT

A tensioning tool device includes a flexible or spring support having a spring bearing that translates a linearly applied external force at an input to linear displacement at an output of the spring bearing. An external force applied to the input of the spring bearing causes the output to pull on a section of the optical fiber and imparts axial strain and tension in the optical fiber. The spring bearing includes one or more sets of parallel flexible beams cantilever-coupled to the input and output, to provide a flexible/spring structure that couples an external force input to an output coupled to the first section of the optical fiber. The external force is applied to displace the input to flex the fixed-guided beam(s) to impart axial tension in the optical fiber at the output of the flexible bearing.

20 Claims, 12 Drawing Sheets

(51) Int. Cl.
  *B26F 3/02* (2006.01)
  *C03B 37/16* (2006.01)
  *B26F 3/00* (2006.01)
(52) U.S. Cl.
  CPC .......... *Y10T 225/12* (2015.04); *Y10T 225/357* (2015.04)
(58) Field of Classification Search
  USPC .................... 225/101, 2, 96, 96.5; 65/433
  See application file for complete search history.

(56) References Cited

U.S. PATENT DOCUMENTS

| | | | | |
|---|---|---|---|---|
| 4,257,546 A * | 3/1981 | Benasutti | ............... | G02B 6/25 225/2 |
| 4,322,025 A * | 3/1982 | Johnson | ............... | G02B 6/25 225/2 |
| 4,445,632 A * | 5/1984 | Margolin et al. | ........ | G02B 6/25 225/101 |
| 4,530,452 A * | 7/1985 | Balyasny et al. | ........ | G02B 6/25 225/101 |
| 4,667,862 A * | 5/1987 | Millar et al. | ............. | G02B 6/25 225/101 |
| 5,842,622 A * | 12/1998 | Mansfield et al. | ........ | G02B 6/25 225/105 |
| 6,668,128 B2 * | 12/2003 | Hattori et al. | .......... | G02B 6/245 385/134 |
| 8,740,029 B2 * | 6/2014 | Barnoski et al. | ........ | G02B 6/25 225/2 |
| 2010/0239221 A1 | 9/2010 | Robichaud et al. | | |
| 2012/0000956 A1 | 1/2012 | Barnoski et al. | | |

OTHER PUBLICATIONS

Liaw et al., "Constrained Motion Tracking Control of Piezo-Actuated Flexure-Based Four-Bar Mechanisms for Micro/Nano Manipulation", IEEE Transactions on Automation Science and Engineering, IEEE Service Center, New York, vol. 7, No. 3, Jul. 1, 2010, pp. 699-705.

* cited by examiner

TENSIONING DEVICE HAVING A FLEXURE MECHANISM FOR APPLYING AXIAL TENSION TO CLEAVE AN OPTICAL FIBER AND METHOD

PRIORITY CLAIM

This application claims the priority of U.S. Provisional Patent Application No. 62/051,830 filed on Sep. 17, 2014, which is fully incorporated by reference as if fully set forth herein. All publications noted below are fully incorporated by reference as if fully set forth herein.

BACKGROUND OF THE INVENTION

Field of the Invention

The present invention relates to optical fibers, in particular the cleaving of optical fibers to produce a flat end on the fiber.

Description of Related Art

There are many advantages to transmitting light energy via optical fiber waveguides and the use thereof is diverse. Single or multiple fiber waveguides may be used simply for transmitting visible light to a remote location. Complex communication systems may transmit multiple specific optical signals. These devices often require the coupling of fibers in end-to-end relationship with the coupling representing a source of light loss. The cleaved end should be smooth and defect-free. If the ends of the fiber are uneven, excessive light loss can result due to reflection and refraction of light at the cleaved end surface (e.g., a splice or juncture region). For the vast majority of fiber optic applications, it is important to cleave the fiber such that the end of the fiber is completely flat in preparation for coupling. When placing optical fibers in end-to-end relationship, to minimize light loss, it is desirable to have the end faces of the fibers be smooth and lie in a plane perpendicular, or at a specific angle, to the axis of the fibers. In short, the cleaved fiber end face needs to be a single plane that is mirror quality to optimize coupling between fibers in demountable connectors, permanent splices and photonic devices.

In theory, an optical fiber can be cleaved to produce a flat end face by propagating crack growth in controlled fashion. In summary, optical fiber cleaving requires two principle steps: (a) scribing a crack (i.e., a tiny fracture) in the fiber (e.g., at a point on the circumference or around the circumference of the fiber), which serves as an initial shallow crack or fracture at the surface, and (b) applying a suitable tensile stress to cause the scribed crack to grow and propagate across the cross-section of the optical fiber, beginning at the circumference and growing radially towards the center.

Conventional cleaving is done by either use of mechanical cleaving or laser cleaving. Heretofore, according to one conventional mechanical cleaving approach to produce a break at a desired section of the optical fiber, the coating at that section is stripped off. The optical fiber may be first placed under axial tension, and then the bare section of the optical fiber is scribed to initiate a crack. The resulting cleave angle and surface features are a direct result of both the quality of the scribe and axial stress and/or strain distribution in the optical fiber. The axial tension applied is necessary to propagate the crack. However, too much tension will cause the crack to propagate too fast, creating hackle on the cleaved end. If too little tension is used, the scribing edge will be required to penetrate too deeply into the fiber to initiate the crack, giving a poor cleave.

Given the imperfections created at the cleaved ends of the fibers, current cleaving approaches involve conventional cleaving of the optical fiber followed by mechanical or laser polishing of the resultant end face to eliminate imperfections of the cleaved face non-planar form. Such polishing step can be automated, but it requires elaborate and expensive equipment and a rather complex procedure, which limit the operation to being performed in a factory or laboratory.

U.S. Patent Application Publication No. US2012/0000956 A1 (which had been commonly assigned to the assignee of the present invention, and fully incorporated by reference herein) discloses a deterministic cleaving process that can be simply and reliably deployed to properly cleave optical fibers to obtain smooth ends, so as to minimize light loss when the fibers are subsequently coupled. In accordance with the disclosure, axial tension is applied to an optical fiber that had been scribed at the intended cleave location, wherein the axial tension is applied in a time-varying manner to maintain the stress intensity factor for crack on the fiber within an acceptable level to produce a stable crack growth from the circumference towards the center at a reasonable rate to cleave the fiber. Careful control of the applied tension force with time acts to control the velocity of the propagating crack by maintaining a substantially constant stress intensity factor. In one embodiment, the applied axial tension force is reduced with time and/or crack growth. As a result, the strain energy in the fiber material is released by formation of a single plane with an optical quality surface without requiring polishing. A substantially flat optical surface of enhanced optical quality is formed at the cleaved end of the optical fiber.

To facilitate optical fiber cleaving processes, such as the deterministic optical fiber cleaving process disclosed in U.S. Patent Application Publication No. US2012/0000956 A1, there is a need to develop an effective, convenient and reliable mechanism to apply axial tension in a controlled manner.

SUMMARY OF THE INVENTION

The present invention provides a mechanism in a device to apply axial tension in a controlled manner, which properly cleaves optical fibers to obtain smooth ends, so as to minimize light loss when the fibers are subsequently coupled. The cleaving mechanism in accordance with the present invention provides an effective, efficient and reliable approach to prepare optical fiber end faces that are flat, which may obviate subsequent polishing.

In accordance with the present invention, a tensioning device includes a flexible or spring support having a spring (flexural) bearing that translates via a spring coupling a linearly applied external force at an input to a linear displacement and force at an output of the spring bearing. A first section of the optical fiber (at one side of a pre-scribed initial surface crack at the intended cleave location) is fixedly coupled to the output of the spring bearing, and a second section of the optical fiber (at the other side of the crack) is fixedly held. When an external force is applied to the input of the spring bearing, the spring coupling causes the output to pull on the first section of the optical fiber and thereby subject the optical fiber to axial strain, to thereby impart an axial tension force on the optical fiber. The external force applied to the input of the spring bearing causes linear displacement at the input, which displacement via the spring coupling within the spring bearing creates a linear displacement of the first section of the optical fiber at the output of the spring bearing with respect to the second section of the optical fiber, to thereby subject the optical fiber to strain and axial tension force in the optical fiber. The axial tension applied to the optical fiber would be dependent on the spring characteristics of the spring bearing. The initial surface crack propagates across the cross-section of the optical fiber (e.g., radially to the center of the optical fiber if a circumferential crack was scribed).

In one aspect of the embodiment, the spring bearing comprises a flexure mechanism or flexural bearing to provide the spring coupling of the output to the input. In one embodiment, the flexure mechanism includes one or more flexible fixed-guided beams cantilever-coupled to the input and output, to form a flexible/spring structure for a spring coupling that couples an external force input to an output coupled to the first section of the optical fiber. The external force is applied to displace the input to flex the guided beam(s) to impart axial tension in the optical fiber at the output of the flexible bearing.

In one embodiment, a set of parallel fixed-guided beams are provided in the flexible bearing. In another embodiment, there are at least two sets of fixed-guided beams, wherein the two sets are cantilevered on either side of an input block to which the external force is applied. Each set of fixed-guided beams comprises at least two fixed-guided beams. In one embodiment, the fixed-guided beam comprises a planar spring material (e.g., spring steel, high-strength copper alloy, or high strength titanium alloy) cantilevered between the input of the spring bearing (e.g., a block that cantilevers the end of the guide beam at the input) and the output of the spring bearing.

In a further aspect of the present invention, using the tensioning tool in accordance with the present invention, an axial tension is applied to the optical fiber that had been scribed with an initial surface crack at the intended cleave location, wherein the applied axial tension is regulated to maintain the stress intensity factor for the crack to be within an acceptable level to produce a stable crack growth at a reasonable rate to cleave the fiber without requiring polishing of the end surface. In one embodiment, the tensioning tool of the present invention may be configured to practice the deterministic optical fiber cleaving process disclosed in U.S. Patent Application Publication No. US2012/0000956 A1. In one embodiment of the present invention, the basic approach is to scribe a crack into the optical fiber on its outside diameter either fully around the circumference of the fiber or in selective regions around the circumference, and then apply a time-varying force co-axial to the fiber longitudinal axis to cleave the fiber. The fiber may or may not be initially held under a substantially constant tension when it is being scribed. A carefully controlled scribing process provides only an initial surface crack without sub-surface crack, which defines the location where crack propagation across the fiber will be initiated with sufficient axial tension. The scribe may be produced mechanically by a scribing tool (e.g., the scribing tool the scribing tool disclosed in U.S. Patent Publication No. US2014/0083273A1), or a laser ablation process, or subjecting to other forms of ablation such as a focused ion beam. Applying a time varying force to the fiber causes the initial crack to propagate radially inward towards the fiber's center. In one embodiment, careful control of the applied tension force with time acts to control the velocity of the propagating crack by maintaining a substantially constant stress intensity factor. In another embodiment, the applied axial tension force is reduced with time and/or crack growth (as crack propagates). As a result, the strain energy in the fiber material is released by formation of a single plane with an optical quality surface without requiring subsequent polishing. More particularly, a substantially flat optical surface or facet of enhanced optical quality is formed at the cleaved end of the optical fiber. The facet surface may be formed at an angle to the longitudinal axis of the fiber by appropriately placing the initial scribe.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides a mechanism in a device to apply axial tension in a controlled manner, which provides the necessary axial tension to properly cleave optical fibers to obtain smooth damage-free ends, so as to minimize light loss when the fibers are subsequently coupled. The cleaving mechanism in accordance with the present invention provides an effective, efficient and reliable approach to prepare optical fiber end faces that are flat, which may obviate subsequent polishing.

Figure 1:
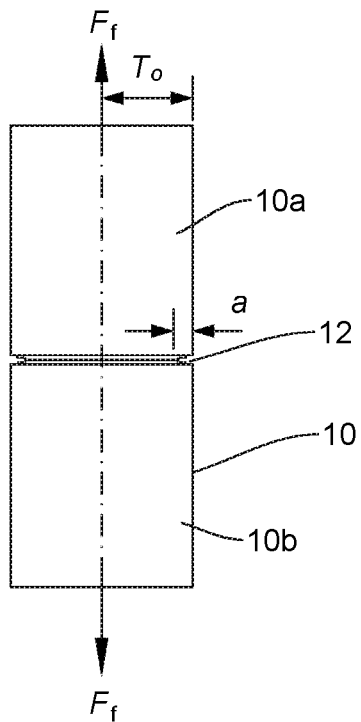
FIG. 1 illustrates optical fiber cleaving using Mode I, in accordance with one embodiment of the present invention.

By way of background, there are three basic modes of fracture of fiber: Mode I (opening mode), Mode II (sliding mode), and Mode III (tearing mode). For the controlled fracture of optical fibers a fiber cleaving process, Mode I is applied. Referring to FIG. 1, a section of an exemplary optical fiber 10 is shown. For the illustration in FIG. 1, only the bare fiber is shown (i.e., including core with cladding exposed, without protective buffer and jacket layers). The fiber 10 is cylindrical, having a circular cross-section. The fiber 10 has a core of doped silica, which is coated with a cladding of silica. As illustrated, an external circumferential crack 12 is provided around the optical fiber 10 (i.e., on the surface of the cladding layer) for initiating crack propagation for cleaving using Mode I loading. For example, the shallow circumferential crack 12 with a crack depth of a on the fiber is prepared by scribing it with a diamond or carbide tip while rotating the fiber about its axis or rotating the scribing tip about the fiber (e.g., using the scribing tool the scribing tool disclosed in U.S. Patent Publication No. US2014/0083273A1). The crack 12 separates a first section 10a and a second section 10b of the optical fiber 10. When one end of the fiber 10 is pulled axially by a sufficient force $F_f$ (i.e., an equal and opposite axial tension force $F_f$), while holding the opposite end of the fiber 10, the circumferential crack 12 grows radially inward towards the center within the stable crack growth velocities. As will be described later below, in accordance with another aspect of the present invention, by appropriately controlling the tensioning tool of the present invention to apply a time varying axial tension force $F_f$, a stable crack growth propagation condition is achieved in which the circumferential crack on the fiber grows radially inward towards the center within the stable crack growth velocities.

In accordance with the present invention, a novel tensioning tool is provided that can be used to apply an axial force that tensions the optical fiber 10. Referring to the embodiment illustrated in FIGS. 3-7, the tensioning tool 20 includes a base 21, on which a frame 23 is fixedly attached (e.g., by bolts 13, shown in FIG. 4), and a flexible or spring support for the optical fiber 10 in the form of a spring bearing 22 is defined. The optical fiber 10 is fixedly supported on the top of the frame 23 and the top of the spring bearing 22. A first section 10a of the optical fiber 10 (at one side of a prescribed initial surface crack 12 at the intended cleave location) is fixedly coupled to the output (at 26) of the spring bearing 22, and a second section 10b of the optical fiber (at the other side of the crack 12) is fixedly coupled to the top of the frame 23. An external force F applied linearly at an input (at 24) of the spring bearing 22 is translated to linear displacement at the output (at 26) of the spring bearing 22, thereby causing strain and axial tension Fa in the optical fiber 10 that is coupled to the output of the spring bearing 22.

As shown in the drawings, in one aspect of the embodiment, the spring bearing 22 comprises a flexure bearing or flexure mechanism 30. In the disclosed embodiment, the flexure mechanism 30 includes one or more flexible beams cantilever-coupled to the input and output of the spring bearing 22 (the input and output of the spring bearing 22 are also the input and output of the flexure mechanism 30), to form a flexible/spring structure comprising fixed guided beams 32 to provide a spring coupling that couples the external force F at the input to the first section 10a of the optical fiber 10 coupled at the output. The external force is applied to displace the input to flex the guided beam(s) to impart axial tension in the optical fiber 10 at the output of the flexible bearing 22. Specifically, a set of parallel fixed-guided beams 32 are provided in the upper section of the flexure mechanism 30. There is an additional set of parallel fixed-guided beams 32 provided in the lower section of the flexure mechanism 30, wherein the two sets of beams 32 are cantilevered on either side of an input block 34 to which the external force F is applied.

Figure 5:
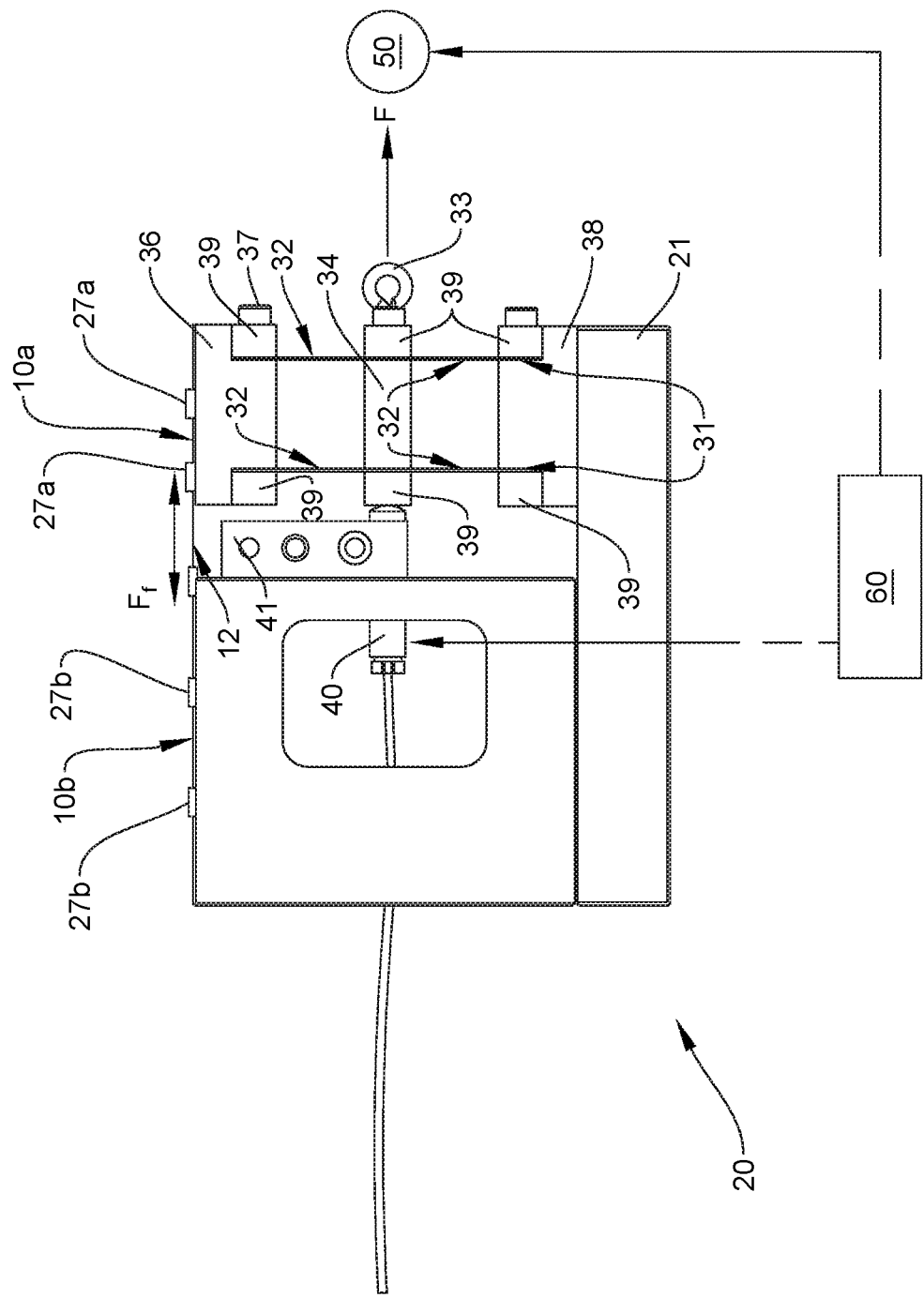
FIG. 5 is a front view of the tensioning device in FIG. 3.
Figure 6:
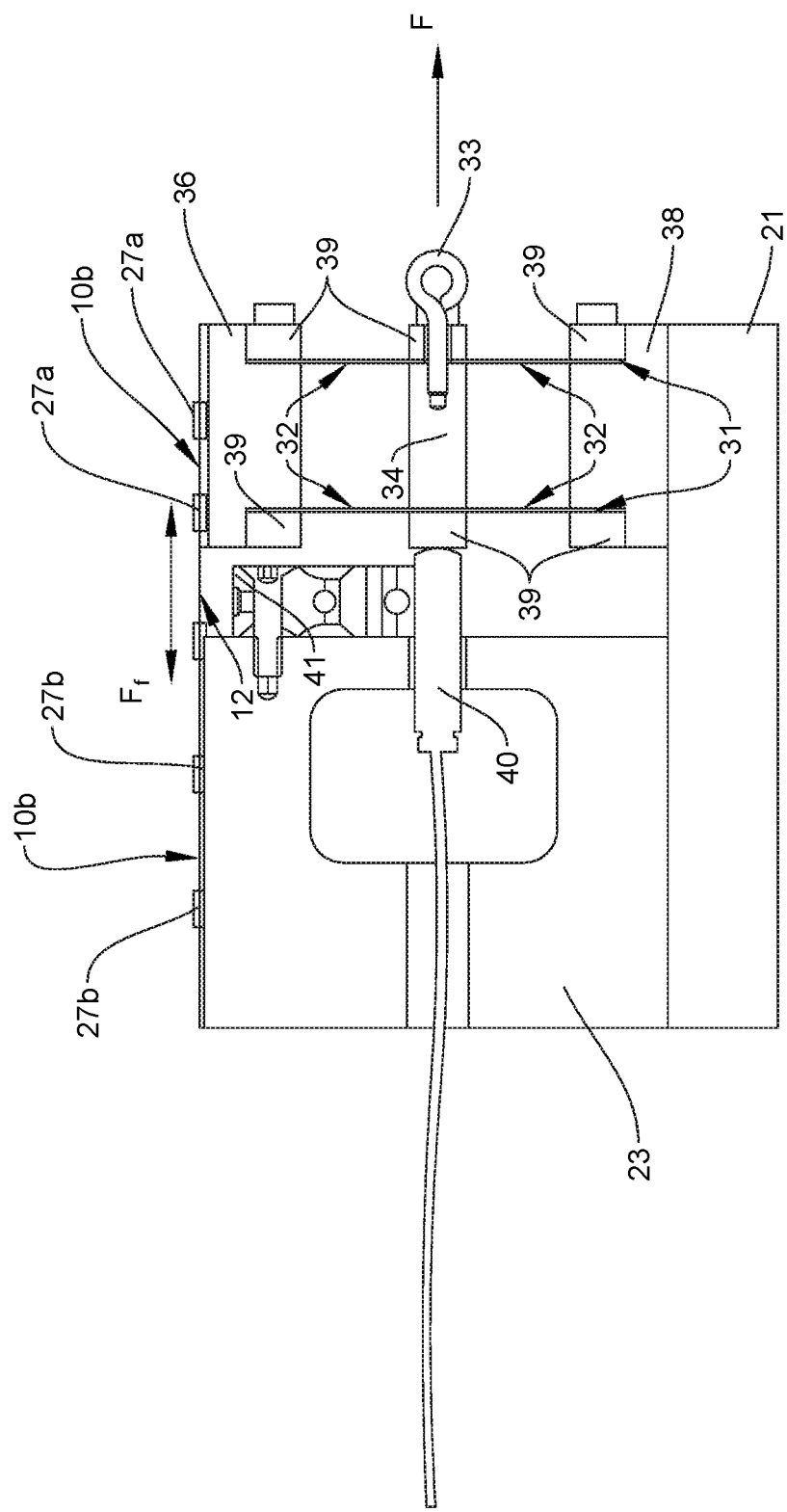
FIG. 6 is a median sectional view taken along line 6-6 in FIG. 7.
Figure 7:
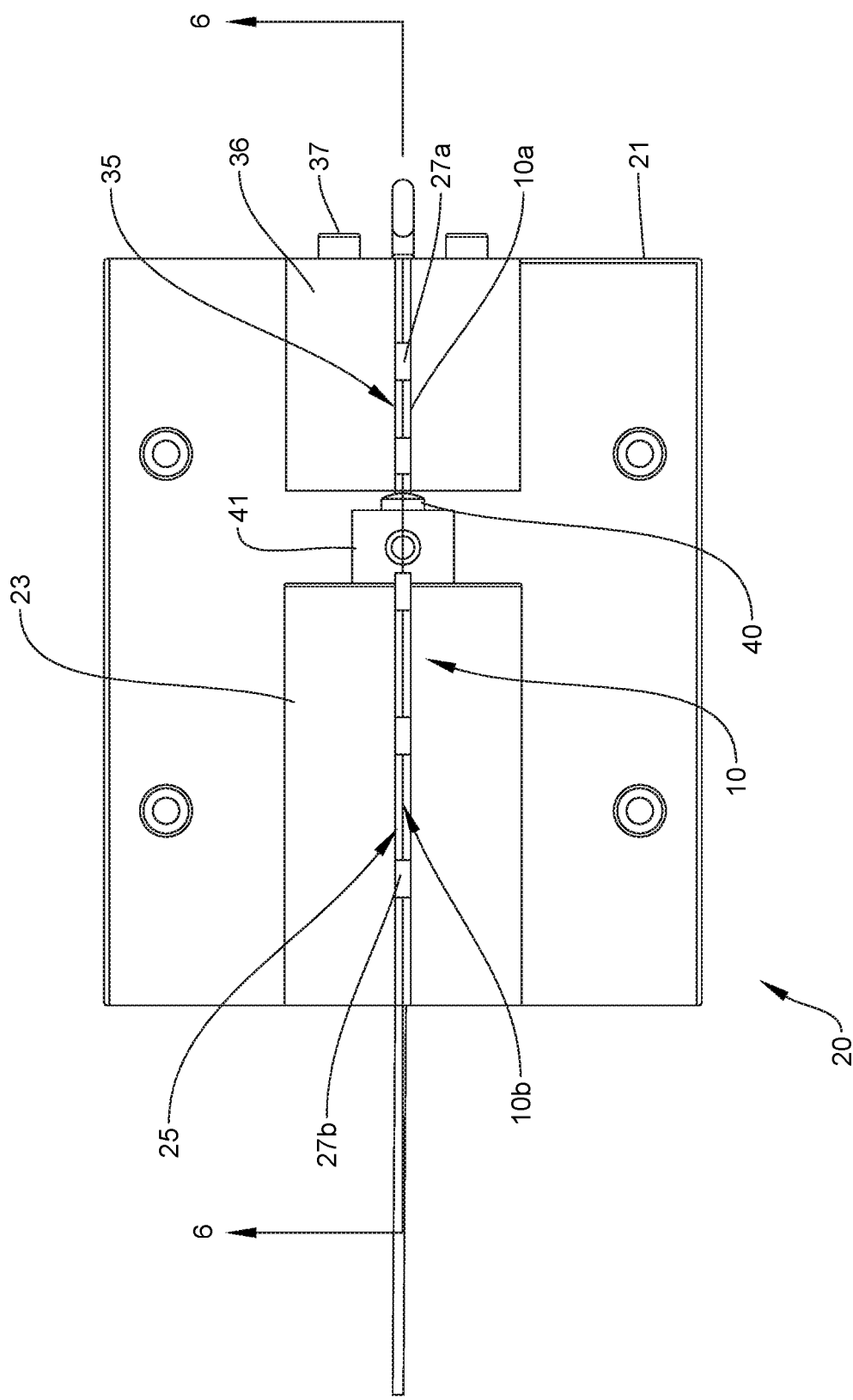
FIG. 7 is a top view of the tensioning device in FIG. 3.
Figure 8:
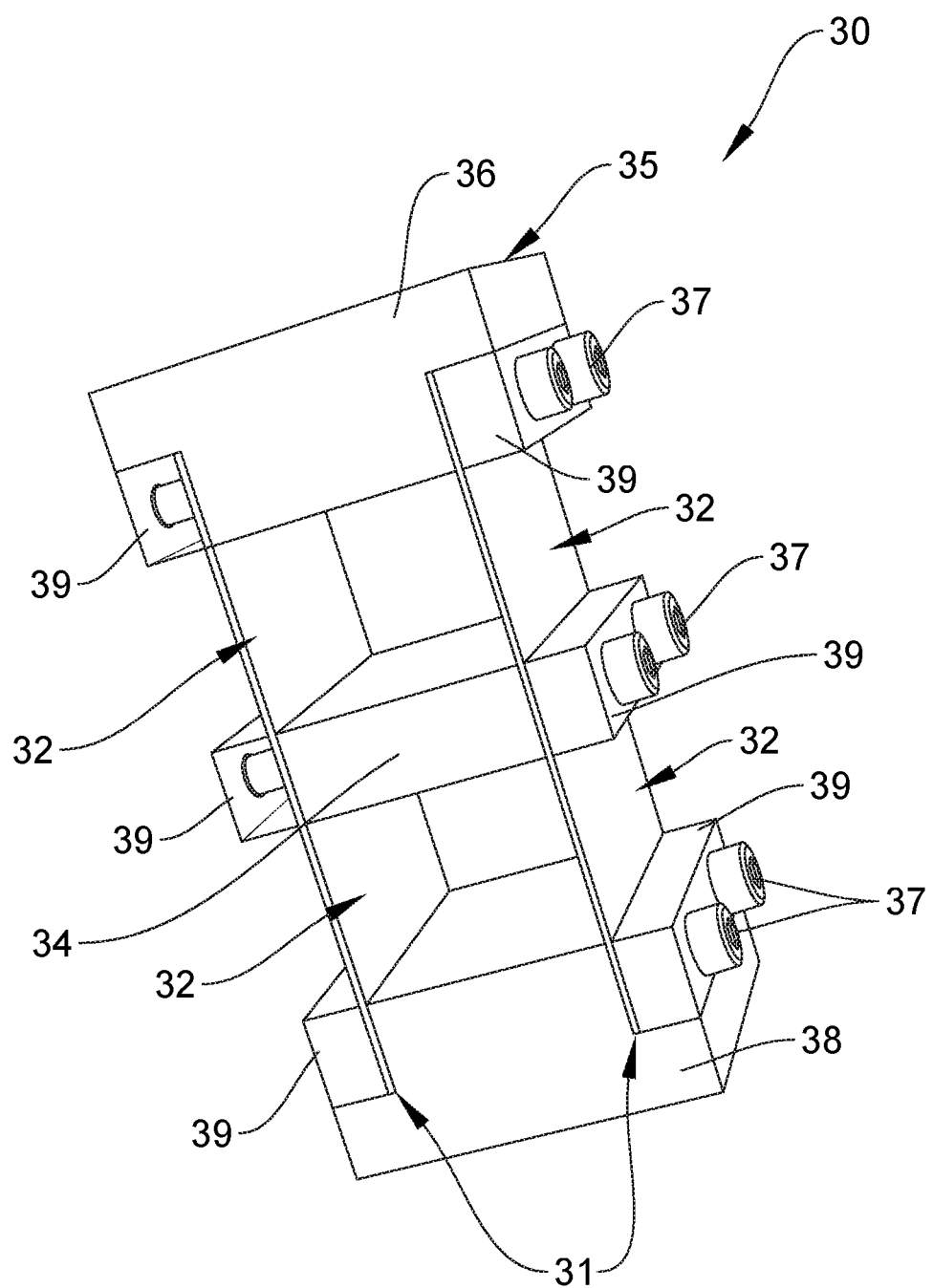
FIG. 8 is a perspective view of a flexure mechanism in accordance with one embodiment of the present invention.
Figure 9:
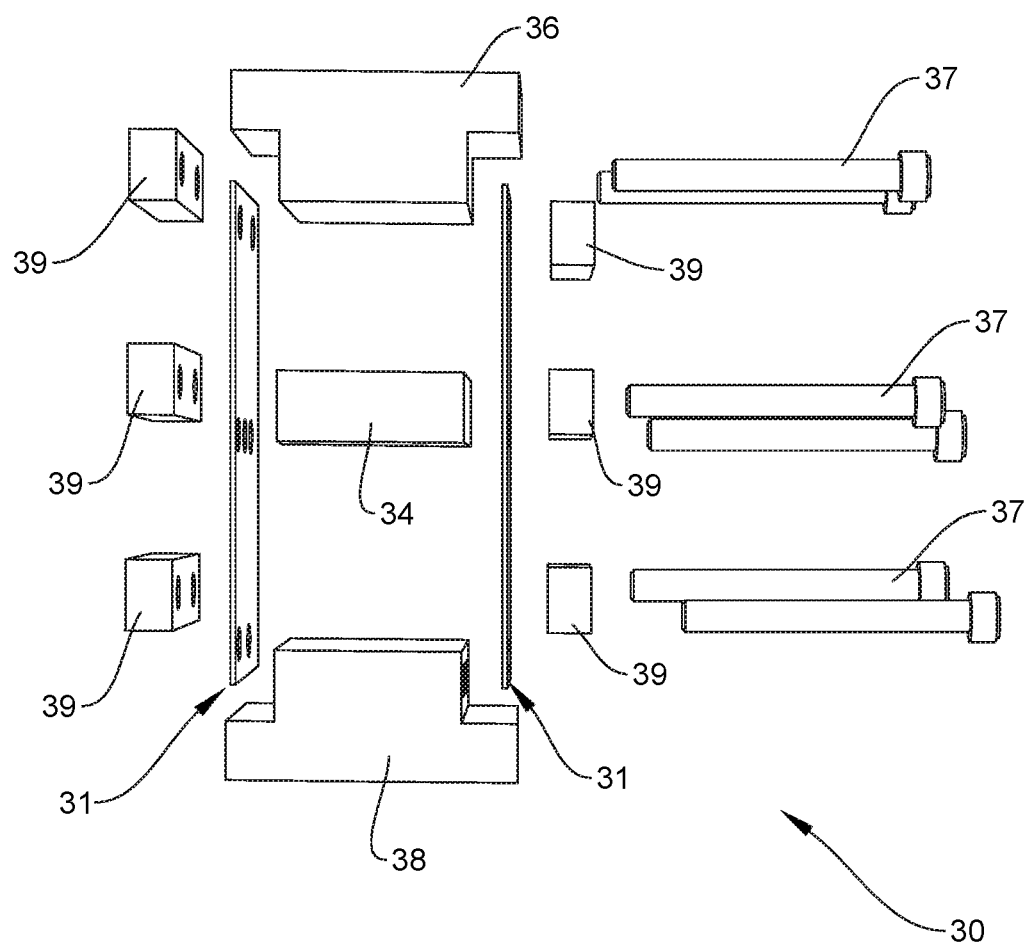
FIG. 9 is an exploded view of the flexure mechanism in FIG. 8.

Referring to FIGS. 8 and 9, the structure of the flexure mechanism 30 is more clearly illustrated. The flexure mechanism 30 includes a top block 36, a bottom block 38, and the intermediate input block 34. These blocks may be made of a material that is sufficiently rigid that it doesn't distort under the applied loads (e.g. aluminum, steel, etc.). The fixed-guided beams 32 are embodied by two plates 31 of planar/sheet spring material (e.g., 0.76 mm thick spring steel). The plates 31 are attached to the opposing sides of the top block 36, input block 34 and bottom block 38, using cover block 39 and bolts 37. Specifically, the cover blocks 39 clamps the plates 31 against the top block 36, input block 34 and bottom block 38 in a cantilevered manner, to define a set of parallel fixed-guided beams 32 between the top block 36 and the input block 34, and a set of parallel fixed-guided beams 32 between input block 34 and the bottom block 38. In the relaxed state as shown in FIG. 5, the plane of the fixed-guided beams 32 are generally perpendicular to the lateral displacement plane of the input block 34 (or the direction of the external applied force F), and lateral displacement plane of the top block 36 (or the direction of the axial tension force $F_f$, and the surface of the bottom block 38/base 21.

While the illustrated embodiment shows plates 31 each being a unitary plate extending from the upper fixed-guided beam 32 above the input block 34 to the lower fixed-guided beam 32 below the input block 34, it is contemplated that the upper and lower fixed-guided beams 32 may be defined using separate, shorter plates.

Figure 4:
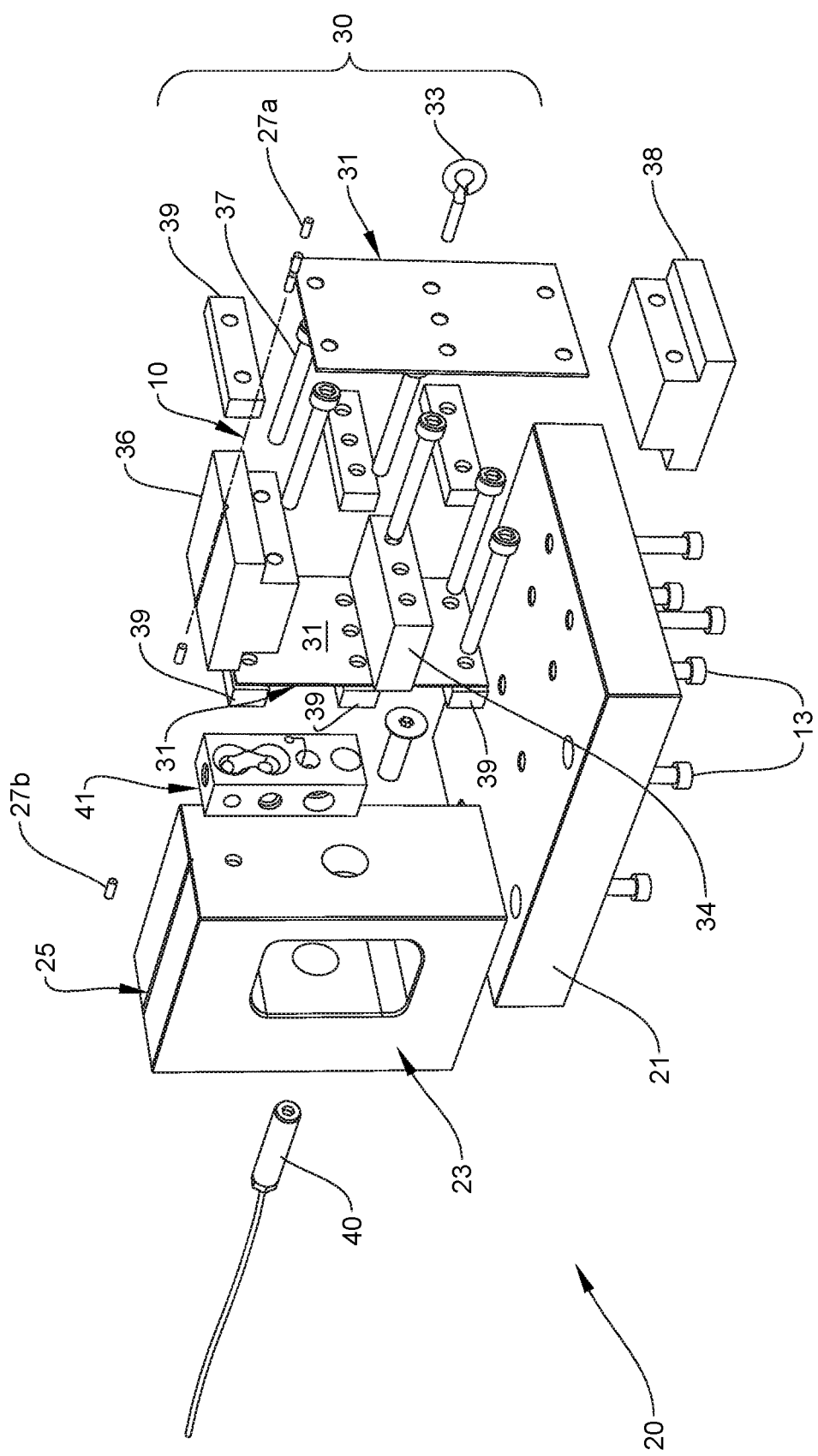
FIG. 4 is an exploded view of the tensioning device in FIG. 3.

Referring back to FIG. 3, the bottom block 38 of the flexure mechanism is fixed to the base 21 (e.g., by bolts 13 as shown in FIG. 4) to define the overall spring bearing 22. The top block 36 provides the output of the spring bearing 22, at which the first section 10a (at one side of the crack 12) of the optical fiber 10 is fixedly coupled to prevent axial movement of the first section 10a relative to the top block 36. For example, a groove 35 is provided at the top of the top block 36 to accommodate the optical fiber 10 and ferrules 27a (e.g., made of zirconia) (better seen in FIGS. 3, 4 and 7). The first section 10a of the optical fiber is received through and fixedly coupled to the ferrules 27a (e.g., by adhesive) that are affixed to the groove 35. (Other means of attaching the optical fiber 10 to the top block 36 may be implemented without departing from the scope and spirit of the present invention. For example, a single ferrule could be epoxied to the second section 10b and clamped on the top of frame 23, and the second section 10a is clamped into a groove provided at the top of the top block 36 without any ferrule.) The input block 34 provides the input of the spring bearing 22, to which the external force F is applied. For simplicity, an eye-hook 33 is provided at the side of the input block 34, to facilitate applying an external pulling force F. The external pulling force F may be provided by a micro-linear actuator 50 controlled by a controller 60 (e.g., a microprocessor), as schematically shown in FIG. 5.

The second section 10b of the optical fiber 10 is fixedly coupled to the top of the frame 23 to prevent axial movement of the second section 10b of the optical fiber 10 relative to the top of the frame 23. A groove 25 is provided at the top of the frame 23, along which ferrules 27b are fixedly attached. The second section 10b is received through and fixedly coupled to the ferrules 27b. The first section 10a and the second section 10b of the optical fiber 10 are supported with the section of the fiber having the crack 12 suspended between the flexure mechanism 30 and the frame 23. At least the upper set of the fixed-guided beams 32 forms a spring coupling between the input and output of the spring bearing 22/flexure mechanism 30.

During operation when an external pulling force F in a direction parallel to the axis of the optical fiber 10 is applied to input block 34 (the input of the flexure mechanism 30 and also the spring bearing 22), the input block 34 is displaced away from the frame 21, thereby bending the lower set of fixed-guided beams 32 below the input block 34. Given the optical fiber is fixedly coupled to the top of the frame 23 and the top of the flexure mechanism 30, the top block 36 is constrained from significant movement prior to fracturing/cleaving of the optical fiber 10 at the crack 12. Given the spring coupling between the input and output of the flexure mechanism 30/spring bearing 22, the displacement of the input block 34 relative to the top block 36 results in bending of the upper set of fixed-guided beams 32 above the input block 34. Spring bias in the spring coupling comprising the upper set of fixed-guided beams 32 causes the top block 36 to pull on the first section 10*a* of the optical fiber 10 and imparts axial strain and stress within the optical fiber 10 (hence the top block 36 functions as an "output" of the spring bearing 22). The axial tension force $F_f$ applied to the optical fiber would be dependent on the spring characteristics of the spring bearing, and the displaced position of the input block 34. With sufficient axial force $F_f$, the initial surface crack propagates across the cross-section of the optical fiber (e.g., radially to the center of the optical fiber if a circumferential crack 12 was scribed). The configuration of the flexure mechanism 30 in the spring bearing 22 maintains parallelism between the external force F and the axial tension force $F_f$ in the optical fiber during the cleaving process. Upon cleaving the optical fiber 10, the upper set of fixed-guided beams 32 straighten under spring bias. The lower set of fixed-guided beams 32 also will straighten under spring bias upon release of the external pulling force F.

It can be realized that the horizontal displacement of the input block 34 is an indication of the axial force in the optical fiber 10, given that the displacement of the input block 34 causes an axial force to be imparted in the optical fiber 10. Accordingly, a displacement sensor 40 is supported through a hole in the frame 23 to provide an indication of the lateral displacement of the input block 36 away from the frame 23. The displacement sensor is preferably a non-contact displacement sensor, such as a capacitive sensor, which is well known in the art. It measures the change in capacitance as the distance or width of the space between the face of the sensor 40 and the facing side of the input block 34 varies with lateral displacement of the input block 34. Such capacitance changes are correlated to displacement in the input block 34, and changes in strain/displacement and thus axial tension force in the optical fiber 10. The same controller 60 may be configured to consider the data of the sensor 40 and control the external pulling force needed to be applied to achieve a desired axial tension force for a fiber cleave.

As illustrated in the drawings, an extension block 41 is provided against the side wall of the frame 23, which aids in the support of the extended portion of the sensor 40. Alternatively, the extension block 41 could be configured as an integral part of the frame 23 (i.e., a monolithic structure including the frame 23 and the extension block 41). Further, frame 23 and/or the bottom block 38 of the flexure mechanism 30 may be configured as an integral part of the base 21 (i.e., a monolithic structure including the base 21 and the frame 23 and/or bottom block 38). While the illustrated embodiment shows plates 31 as separate components that are assembled to the blocks 38, 34, and 36, it is contemplated that these component could also be fabricated monolithically, along with the base 21 and frame 23 using machining processes such as wire electro-discharge machining (wire EDM). It is well known in the art that flexural bearings can be fabricated effectively using wire EDM processes.

It is noted that after a sufficient external pulling force F displaced the input block 34 to a position that would result in sufficient axial force in the optical fiber 10 to initiate and propagate crack growth to cleave the fiber, if this displaced position of the input block 34 is held fixed, the upper set of fixed-guided beams 32 would continue to bias the first section 10*a* of the optical fiber 10 to continue to impart an axial tension force to the optical fiber 10, to continue to increase strain in the optical fiber 10 between the first section 10*a* and the second section 10*b* to cause the crack to propagate into the fiber. The rate of strain could be decreasing with time. As a result, the optical fiber 10 would be subject to an axial tension force that would be decreasing with time after the crack starts to propagate. Accordingly, the tensioning device 20 may be used as a microprocessor-controlled stage to provide a time varying axial force for cleaving optical fibers. Further, a force-based actuator (e.g. pneumatic piston actuator) could be used in combination with a micro-processor controller that regulates applied force as a function of time to control a time-varying force.

In a further aspect of the present invention, the tensioning device 20 in accordance with the present invention, is controlled to apply the above mentioned time varying axial force to the optical fiber, to regulate axial tension to maintain the stress intensity factor for the crack to be within an acceptable level, so as to produce a stable crack growth at a reasonable rate to cleave the fiber without requiring polishing of the end surface. In one embodiment, the tensioning tool of the present invention may be configured to practice the deterministic optical fiber cleaving process disclosed in U.S. Patent Application Publication No. US2012/0000956 A1. In one embodiment of the present invention, the basic approach is to scribe a crack into the optical fiber on its outside diameter either fully around the circumference of the fiber or in selective regions around the circumference, and then apply a time-varying force co-axial to the fiber longitudinal axis to cleave the fiber. The fiber may or may not be initially held under a substantially constant tension when it is being scribed. A carefully controlled scribing process provides only an initial surface crack without sub-surface crack, which defines the location where crack propagation across the fiber will be initiated with sufficient axial tension. The scribe may be produced mechanically by a scribing tool (e.g., the scribing tool the scribing tool disclosed in U.S. Patent Publication No. US2014/0083273A1), or a laser cut, or subjecting to other forms of ablation such as a focused ion beam. Applying a time varying force to the fiber causes the initial crack to propagate radially inward towards the fiber's center. In one embodiment, careful control of the applied tension force with time acts to control the velocity of the propagating crack by maintaining substantially constant stress intensity factor. In another embodiment, the applied axial tension force is reduced with time and/or crack growth (as crack propagates). As a result, the strain energy in the fiber material is released by formation of a single plane with an optical quality surface without requiring subsequently polishing. More particularly, a substantially flat optical surface or facet of enhanced optical quality is formed at the cleaved end of the optical fiber. The facet surface may be formed at an angle to the longitudinal axis of the fiber by appropriately placing the initial scribe.

In one embodiment, careful control of the applied tension force with time acts to control the velocity of the propagating crack by maintaining an acceptable stress intensity factor for the crack on the fiber (e.g., a substantially constant stress intensity factor below a critical stress intensity factor under the particular loading mode). As a result, the strain energy in the fiber material is released by formation of a single plane with an optical quality surface without requiring polishing. More particularly, a substantially flat optical surface or facet of enhanced quality is formed at the cleaved end of the optical fiber without requiring polishing. The facet surface may be formed at an angle to the longitudinal axis of the fiber by appropriately placing the initial crack (e.g., an elliptic scribe in a plane at an angle (e.g., 8 degrees) with respect to the longitudinal axis of the fiber).

In accordance with one embodiment of the present invention, using the tensioning device 20 described above, an external pulling force F is applied to displace the input block 34 sufficiently to initially ramp up the applied axial tension force in the optical fiber 10 to a level sufficient to initiate crack growth (a peak axial tension in the cleaving process, while maintaining the stress intensity factor for the crack below a critical stress intensity factor). The input block 34 is then held in place without further displacement (or subject to further displacement at a slower rate), while the axial tension force in the optical fiber 10 reduces with time from such peak axial tension as the optical fiber 10 continues to strain by the straightening of the upper set of fixed-guided beams 32 in the flexure mechanism 30 to pull the first section 10a from the section 10b of the optical fiber 10 to continue crack growth. From another perspective, after crack propagation is initiated by an initial ramp up of axial tension to a peak axial tension, the applied axial tension force is reduced with further growth in crack depth. The applied axial tension force may be reduced monotonically after crack growth has been initiated, and further decreases at a rate that progressively decreases with time or crack growth.

It is noted that the peak axial tension force may be greater than the tension force required to initiate crack growth, and the peak axial tension force may be maintained constant for a brief period as part of the ramp up before the axial tension force is reduced.

It has been found that with careful control of the progressively decreasing axial force to maintain an acceptable stress intensity factor (e.g., a substantially constant stress intensity factor) below the critical stress intensity factor for a stable crack growth, crack growth at a reasonable rate is produced which results in an end surface that is of acceptable optical quality without requiring polishing (hence would facilitate fiber cleaving in field operation environment). The strain energy in the fiber material is released by formation of a single plane with an optical quality surface. In the context of optical fiber, e.g., for optoelectronic applications, an acceptable optical quality surface is a smooth single plane that is extremely flat, having, for example, a maximum variation of less than 500 nm and preferably 100 nm with respect to a nominal plane, and a surface peak-to-valley roughness that is less than 20 nm and preferably 5 nm.

Further, instead of providing an initial surface crack before tension is applied to the fiber at a level (e.g., the "peak" level referred above) that initiates crack propagation in the prior embodiments, the fiber may be tensioned at or close to such peak level prior to providing the initial surface crack (i.e., using the tensioning device 20 described above, displacing the input block 34 and holding it in place to result in such peak axial tension force in the optical fiber 10). According to the present invention, after crack growth is initiated, the applied tension force is regulated in a manner as described above to stay within an acceptable range of stress intensity factor (e.g., at a substantially constant stress intensity factor), crack growth at a reasonable rate is produced which results in an end surface that is of acceptable optical quality without requiring polishing.

Given that it is desired to maintain an acceptable stress intensity factor for the crack on the fiber as axial force is being applied in order to produce stable crack growth at a reasonable rate to obtain an optical quality surface at the cleaved end, the relationships between applied axial force and crack depth and between applied axial force and time were analyzed. Calculations were conducted for axial force $F_f$ as a function crack depth a and time t, for a fiber radius $r_o$=62.5 μm, initial crack depth $a_o$=1 μm, and critical stress intensity factor $K_{IC}$=0.750 MPa-m$^{0.5}$ for a silica optical fiber.

Figure 2A:
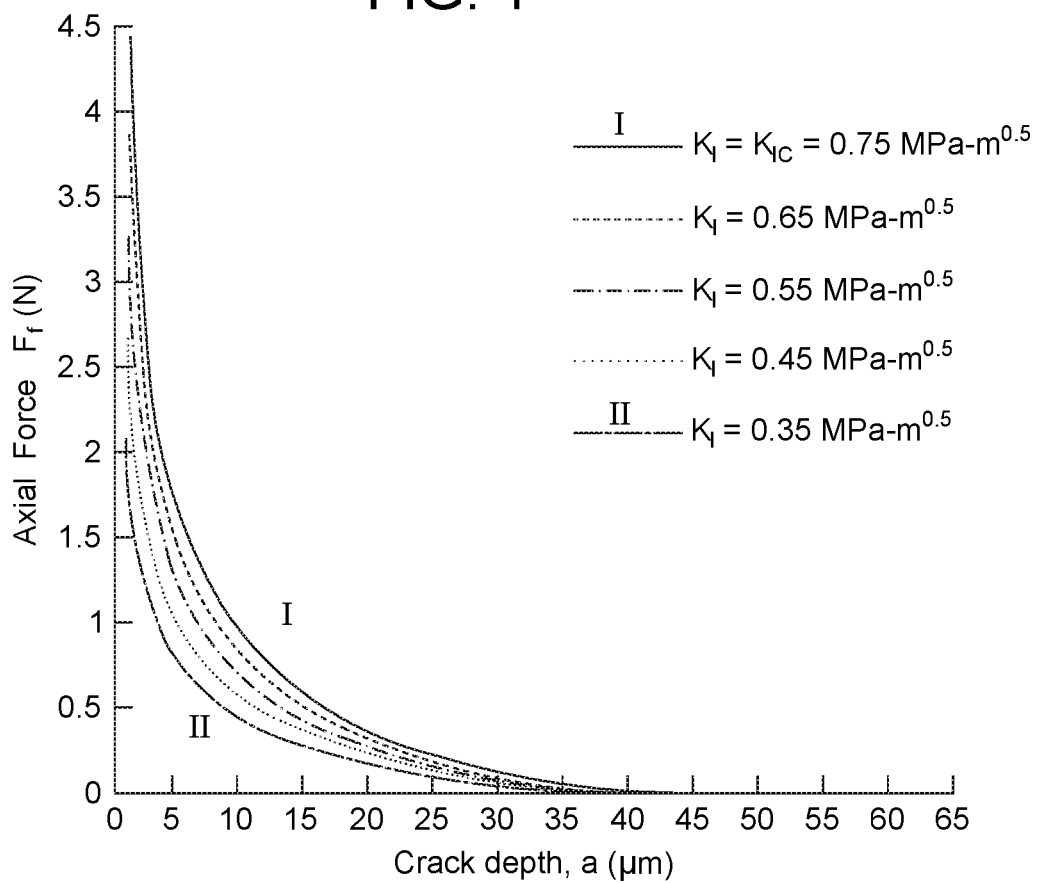
FIG. 2A is a plot of pulling force on silica optical fiber as a function of crack depth.

FIG. 2 is a plot of axial force $F_f$ as function of crack depth a, at various stress intensity factors $K_I$. The plots at the various stress intensity factors $K_I$ are bounded by curve I (representing $K_{IC}$) on the right and curve II on the left. As illustrated, the stress intensity factors $K_I$ are lower progressively from the curve I at $K_{IC}$, to the curve II. The ramp up to the peak axial force that initiated crack growth leading to the start of each of the curves is not shown in FIG. 2. For each of the curves, after axial force ramp up that initiated crack growth, the stress intensity factor $K_I$ is maintained substantially constant. For $K_I$ greater than $K_{IC}$=0.750 MPa-m$^{0.5}$ in the region above curve I, crack growth is believed to be unstable. For $K_I$ less than 0.35 MPa-m$^{0.5}$ in the region below curve II, it is believed that significant crack growth will not be produced due to insufficient axial force to generate sufficient stress intensity factor for the crack on the silica optical fiber to grow at a reasonable rate. Thus, axial force on the fiber shall be maintained within the region in between curve I and II in order to produce a stable crack growth at a reasonable rate to cleave a fiber. One can appreciate from FIG. 2 that, to maintain the stress intensity factor $K_I$ to be within the boundaries of the curve I and curve II (e.g., at a substantially constant stress intensity factor $K_I$ after the ramp up of the axial force $F_f$, the axial force $F_f$ should be decreased rapidly initially when the crack depth increases initially, and axial force $F_f$ is reduced relatively slowly when crack depth is large. In one embodiment, the axial force $F_f$ may decrease monotonically, and may decrease at a rate that progressively decreases with time.

Figure 2B:
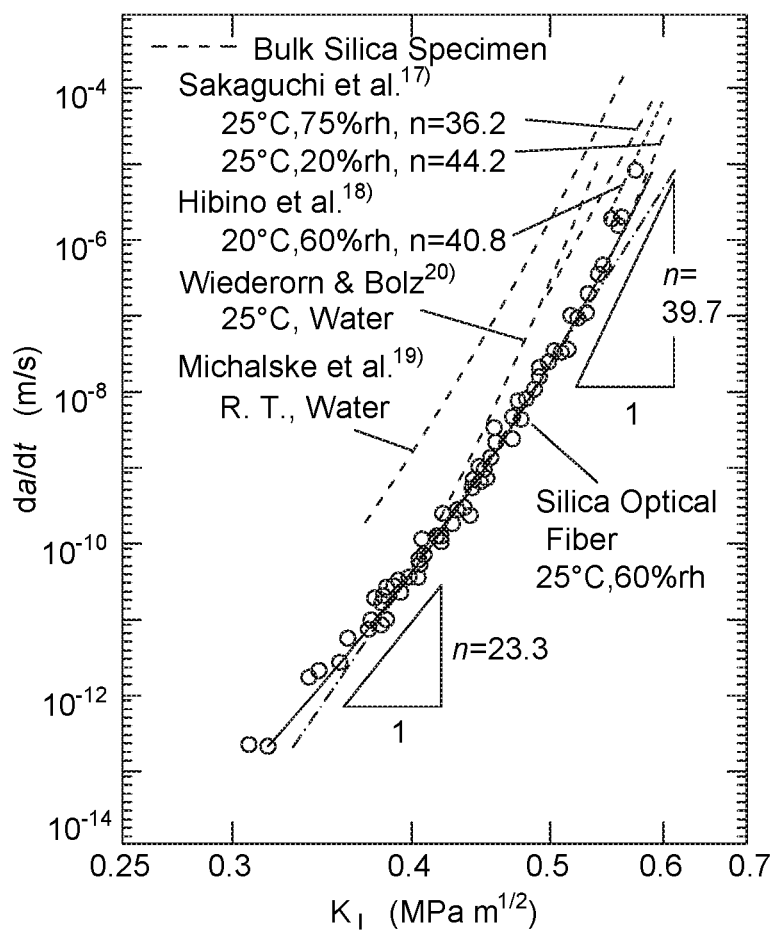
FIG. 2B is a diagram of velocity of crack growth versus stress intensity factor.
Figure 2C:
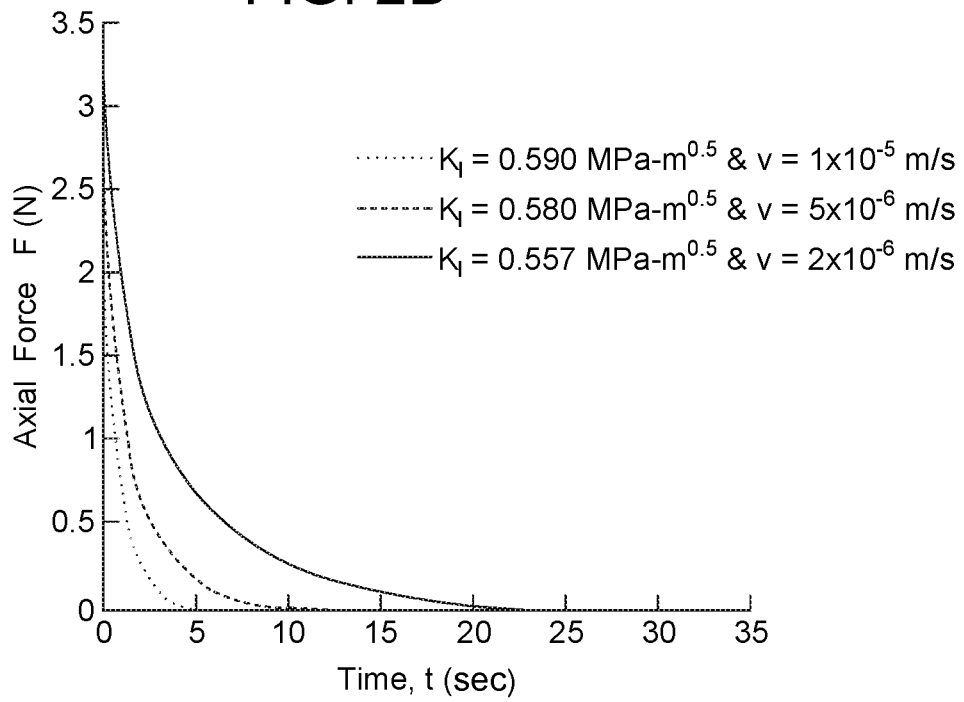
FIG. 2C is a plot of pulling force on the fiber as a function of time.
Figure 3:
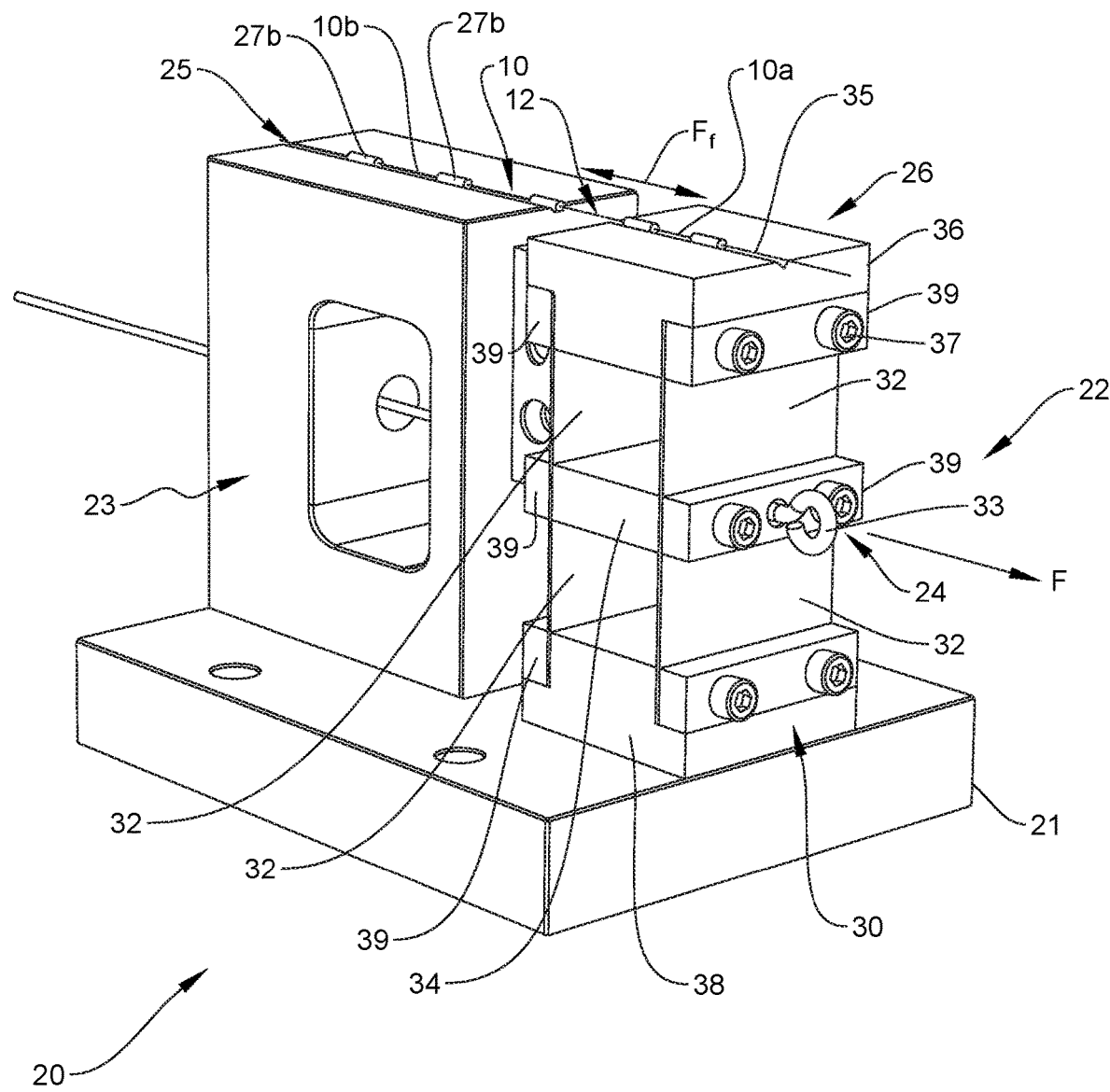
FIG. 3 is a perspective view of a tensioning device in accordance with one embodiment of the present invention.

To consider axial force $F_f$ on the fiber as a function of time t, pairs of stable crack growth velocity v and stress intensity factor $K_I$ are selected from FIG. 2B, which may be referenced from M. Muraoka and H. Abe, "Subcritical Crack Growth in Silica Optical Fibers in a Wide Range of Crack Velocities," *Journal of the American Ceramic Society*, 79 [1], 51-57 (1996). FIG. 2C shows the axial force on the optical fiber as a function of time for three combination pairs of stable crack growth velocity and stress intensity factor. These pairs are 0.590 MPa-m$^{0.5}$ and $1\times10^{-5}$ m/s, 0.580 MPa-m$^{0.5}$ and $5\times10^{-6}$ m/s, and 0.557 MPa-m$^{0.5}$ and $2\times10^{-6}$ m/s, which give cleaving time of about 6 s, 12.5 s, and 31 s, respectively, for an initial crack depth of 1 μm. The structure of the fiber is the same as for FIG. 2 above, i.e., fiber radius $r_o$=62.5 μm, initial crack depth $a_o$=1 μm and critical stress intensity factor $K_{IC}$=0.750 MPa-m$^{0.5}$.

As illustrated in FIG. 2C, the stress intensity factors $K_I$ and the velocity of crack growth v are lower progressively from the curve on the left most to the curve to the right. The axial force ramp up to the peak axial force that initiated crack growth leading to the start of each of the curves is not shown in FIG. 2C. For each of the curves, after the axial force ramp up, the stress intensity factor $K_I$ and velocity of crack growth v is maintained substantially constant. One can appreciate from FIG. 2C that after the axial force ramp up, the axial force $F_f$ should be reduced rapidly with time initially, and $F_f$ is reduced relatively slowly after a long time. The axial force $F_f$ may decreases monotonically, and may decrease at a rate that progressively decreases with crack growth. For stable crack growth in the silica optical fiber, the velocity of crack growth must be kept in between $10^{-15}$ and $10^{-4}$ m/s. To cleave an optical fiber in a reasonable amount of time, the velocity of a crack growth must not be too low ($<10^{-6}$ m/s). For instance, it will take about 1.74 hours to completely cleave a fiber at a crack growth velocity of $10^{-8}$ m/s. Thus, a more reasonable range of crack growth velocity shall be in between $10^{-6}$ and $10^{-4}$ m/s.

Further reference to the deterministic optical fiber cleaving process is disclosed in U.S. Patent Application Publication No. US2012/0000956 A1, the entirety of which is incorporated by reference herein.

Referring to FIG. 10, below is an analysis of the spring bearing 22 implement by flexure mechanism 30 described above, leading to an improved tensioning device 120 discussed below.

Figures 10A, 10B, 10C:
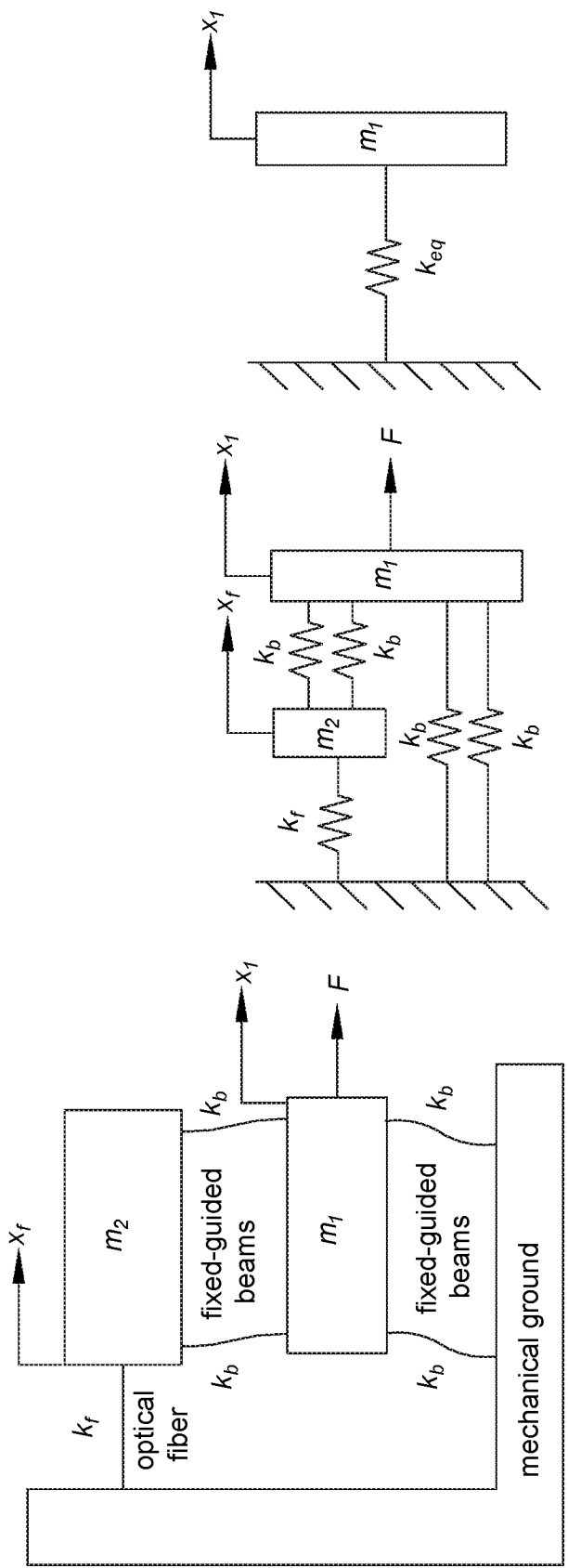
FIG. 10A to FIG. 10C are representations of lump-parameter models of the flexure mechanism.

Referring to FIG. 10A, the flexure mechanism 30 serves as a force divider, in which the force F applied to the translating body (i.e., the input block 34) is reduced by a factor that depends upon the stiffness $k_f$ of the optical fiber to axial force and the bending stiffness of a beam $k_b$ within the flexure.

The axial stiffness $k_f$ of the optical fiber is given by Eq. (1) and depends upon the length $L_f$ of the unfixed segment of the fiber, the elastic modulus of the silica glass fiber $E_f$=72 GPa, and diameter of the fiber d=125E-6 m. For the case of a fiber that is 2 cm in length, the fiber stiffness $k_f$=4.4×10$^4$ N/m.

$$k_f = \frac{\pi d^2 E_f}{4 L_f} \quad (1)$$

The stiffness of an individual beam in the flexure can be modeled as a fixed-guided beam which has the stiffness given in Eq. (2), where $E_b$=180 GPa is the elastic modulus of the steel in the flexure, t is the thickness of the beam, w is the width of the beam, and $L_b$ is the length of the beam. For the case that the beam is made of stainless steel with dimensions t=0.76 mm, w=50.8 mm, and $L_b$=26.7 mm, the stiffness of a single beam is $k_b$=2.1E5 N/m.

$$k_b = \frac{E_b w t^3}{L_b^3} \quad (2)$$

The combined system acts in the manner illustrated by the lumped parameter models in FIG. 10. When a force F is applied to the lower mass $m_1$ (i.e., input block 36), the lower set of fixed-guided beams bend and produce a displacement $x_1$ of mass $m_1$. The upper set of the fixed-guided beams also bend, but their bending motion is much smaller than the bottom set of fixed-guided beams. Consequently, the displacement at the end of the fiber $X_f$ is nearly equal to the displacement $m_1$.

The equivalent spring systems shown in FIGS. 10B and 10C provide a method for computing the displacements and axial tension force acting on the optical fiber. The displacement $x_1$ is computed with Eqs. (3) and (4).

$$x_1 = \frac{F}{k_{eq}} \quad (3)$$

$$k_{eq} = 2k_b \left[ 1 + \frac{k_f}{k_f + 2k_b} \right] \quad (4)$$

The tension force $F_f$ acting on the optical fiber can be computed with Eq. (5).

$$F_f = \left[ \frac{2 k_f k_b}{k_f + 2 k_b} \right] x_1 \quad (5)$$

The ratio of the applied force F to the tension force acting on the fiber can be computed with Eq. (6). For the case where $k_f$=4.4×10$^4$ N/m and $k_b$=2.1×10$^5$ N/m, the ratio between the forces is about 11.5×. Consequently, the axial force in the fiber is de-amplified by 8.7E-2 orders of magnitude compared to the applied force F.

$$\frac{F}{F_f} = \left[ 1 + \frac{k_f}{k_f + 2 k_b} \right]\left[ 1 + \frac{2 k_b}{k_f} \right] \quad (6)$$

$$\frac{F}{F_f} = \frac{2(k_b + k_f)}{k_f} \quad (7)$$

It has been determined that an approximate axial tension force of about 5 N (see FIG. 2A) is necessary to initiate crack growth when deterministically cleaving an optical fiber. Therefore, about 60 N (13.5 lbf) should be needed as the maximum external force F needed to pull on the input block 36 of the flexure mechanism 30.

It can be realized that the displacement x1 of mass m1 (input block 34) is an indication of the axial force in the optical fiber 10, given that the displacement of the input block 34 causes an axial force to be imparted in the optical fiber 10.

Figure 11:
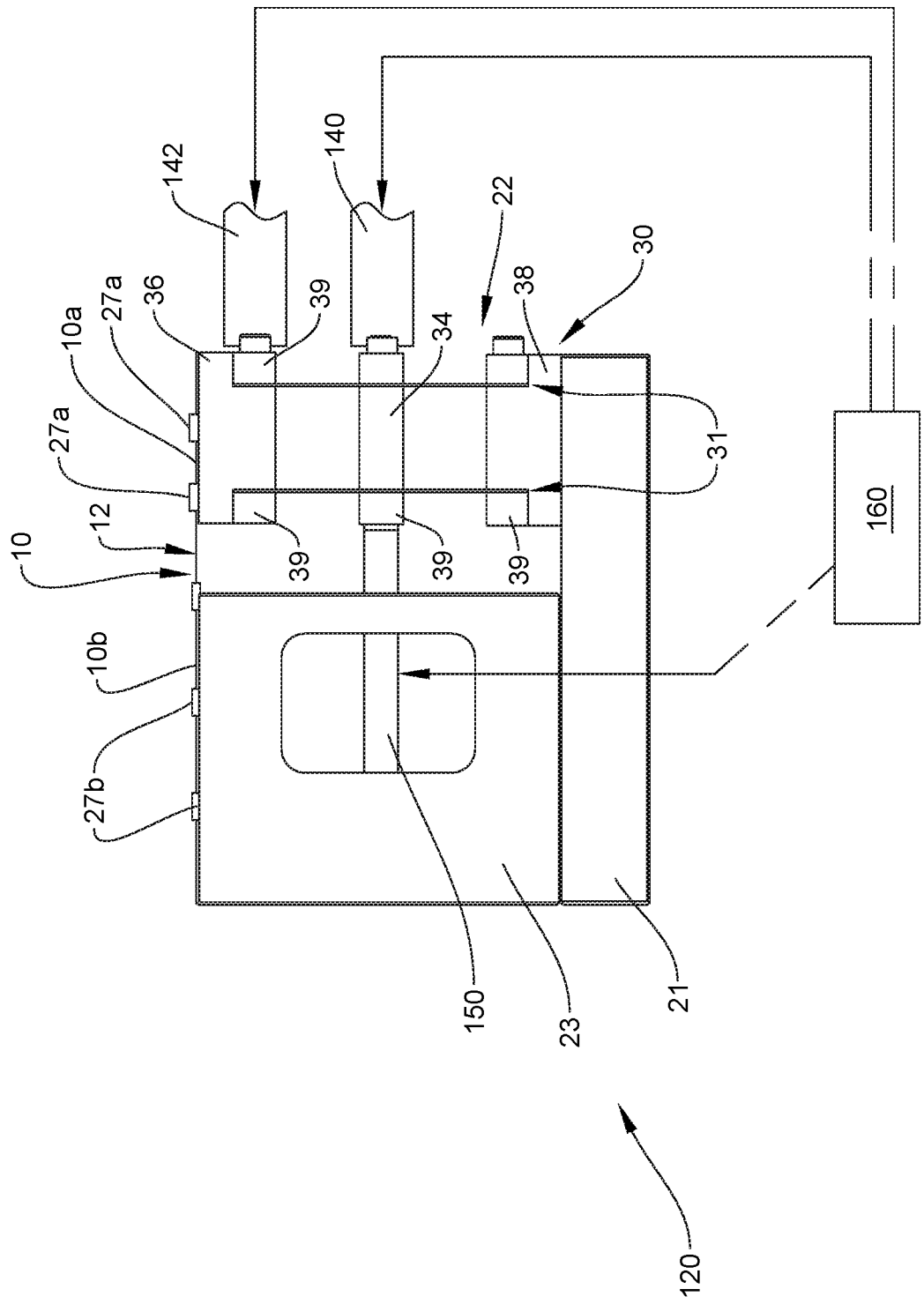
FIG. 11 is a perspective view of a tensioning device in accordance with another embodiment of the present invention.
Figure 12:
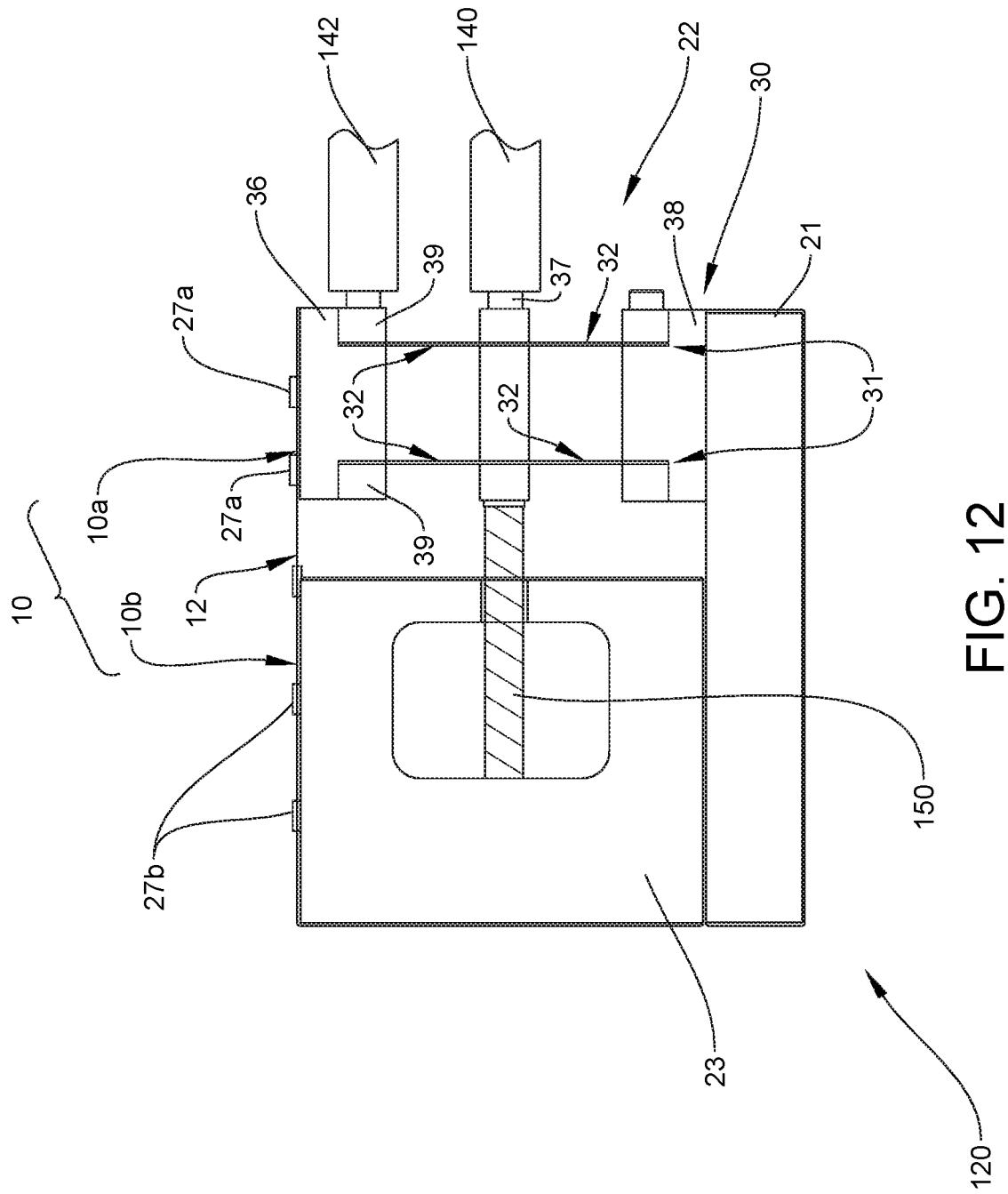
FIG. 12 is a median sectional view of the tensioning device in in FIG. 11.

Referring to FIGS. 11 and 12, an improved tensioning device 120 is illustrated. Comparing the tensioning device 120 to the tension device 20 in the previous embodiment, the tensioning device 120 has the same flexure mechanism 30, but instead of a pulling force to laterally displace the input block 34, a pushing force is deployed from the frame 23. The pushing force can be implemented by a micro-positioner or micro-actuator, such as a piezoelectric actuator 150 (e.g., a piezoelectric stack actuator known in the art), extending through a hole in the frame 23 against the facing side of the input block 34. By appropriate controlling of the piezoelectric actuator 150 using a controller 160, the contact end of the piezoelectric actuator 150 applies a desired force to push against the facing side of the input block 34 to achieve a desired intended displacement, and hence providing an intended axial tension force in the optical fiber 10 for cleaving.

Another improvement over the earlier embodiment is the provision of a displacement sensor 140, 142 (preferably non-contact displacement sensor) for each of the top block 36 and the input block 34. The displacement sensor 140, like the displacement sensor 40 in the earlier embodiment, measures changes in capacitance which correlate to the lateral displacement of the input block 34. Such measured displacement is used to determine the force imparted by the piezoelectric actuator 150 on the input block 34. The displacement sensor 142 directly measures changes in the strain/displacement in the optical fiber 10, thus providing a more direct indication of the condition within the optical fiber 10 (instead of relying on the correlation between the axial tension force in the optical fiber 10 and the displacement of the input block 34 as practiced in the prior embodiment). The displacement sensor 142 (e.g., a capacitive sensor) measures the change in capacitance as the distance or width of the space between the face of the sensor 142 and the facing side of the top block 36 varies with lateral displacement of the top block 36 as a result of lateral displacement of the input block 34.

The tensioning device 120 can be used to undertake a deterministic cleave of an optical fiber (i.e., the axial tension force is provided in a time varying manner). The upper sensor 142 determines when a desired "peak" level of the axial tension force to initiate crack growth in the optical fiber 10 is reached independent of the external force applied to displace the input block 34. Thereafter, the displacement of the input block 34 can be controlled to obtain a desired time varying axial tension force profile to be followed for continue crack growth in a stable manner to obtain a high quality cleave, with the upper sensor 142 providing feedback on the measured axial strain in the fiber and hence how the axial tension force is varying with time, and the lower sensor 140 providing feedback on the displacement of and hence the force on the input block 34. By considering measurements from both sensors 140 and 142, the tensioning device 120 can be controlled by the controller to provide the desired time varying axial tension force for the fiber to obtain a high quality cleave. The same controller 160 may be configured to consider the various measurements from the sensors 140 and 142 and appropriately controlling the piezoelectric actuator 150 to obtain the desired time varying axial tension force profile.

In the described embodiment, the displacements can be measured with a capacitive displacement sensor which can have a resolution on the order of a few to about 10 nm. An applied load of 60 N will cause a displacement of about x1=0.13 mm. With a 1 nm displacement resolution, this would correspond to a force resolution of less than 0.5 mN.

The correlation of the sensor readings to displacement and force can be calibrated prior to deploying the tensioning devices disclosed above for fiber cleaving.

It is noted that the above described embodiments of the tension device may be implemented in a portable tool (e.g., a hand tool) for field use.

\* \* \*

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:

1. A tensioning device for applying an axial force to cleave an optical fiber that includes an initial crack scribed on the surface of the optical fiber to define a desired cleave location between a first section and a second section along the optical fiber, the tensioning device comprising:
 a base;
 a spring bearing including an input, an output, and a spring coupling that couples the output to the input, wherein the output comprises a first coupling structure to fixedly couple thereto the first section of the optical fiber at one side of the crack to prevent axial movement of the first section relative to the output; and
 a frame comprising a second coupling structure to fixedly couple thereto the second section of the optical fiber at another side of the crack to prevent axial movement of the second section relative to the frame,
 wherein an external force applied to the input of the spring bearing causes linear displacement at the output via the spring coupling, creating a linear axial displacement of the first section of the optical fiber with respect to the second section of the optical fiber, to thereby subject the optical fiber to strain and axial force;
 wherein the spring coupling comprises:
  an upper set of at least two parallel fixed-guided beams, and
  a lower set of at least two parallel fixed-guided beams; and
 wherein the spring bearing further comprises:
  a top block, an input block and a bottom block, the bottom block being fixed to the base, wherein the upper set of parallel fixed-guided beams is cantilever-coupled to the top block and to the input block, and the lower set of parallel fixed-guided beams is cantilever-coupled to the input block and to the bottom block,
  wherein the input block forms the input of the spring bearing, and the top block is linearly displaceable and forms the output of the spring bearing, and
  wherein the top block comprises the first coupling structure to prevent axial moment of the first section of the optical fiber relative to the top block.

2. The tensioning device as in claim 1, wherein the input block of the spring bearing is linearly displaceable and is subject to linear displacement when the external force is applied to the input, and wherein the spring bearing will continue to subject the optical fiber to axial force when the input is held in place without further displacement of the input block.

3. The tensioning device as in claim 1, wherein each fixed-guided beam comprises a planar spring material.

4. The tensioning device as in claim 1, wherein the input block is laterally displaceable such that applying the external force to laterally displace the input block will cause displacement of the top block to subject the optical fiber to strain and stress.

5. The tensioning device as in claim 4, further comprising a first displacement sensor determining the lateral displacement of the input block.

6. The tensioning device as in claim 5, further comprising a second displacement sensor determining the lateral displacement of the top block.

7. The tensioning device as in claim 1, further comprising a controller and an actuator, wherein the actuator is operatively connected to the input and to the controller, wherein the controller controls the actuator to cause the input to initially subject the optical fiber to an initial axial force to initiate crack growth from the initial crack and, after crack growth is initiated, to cause the input to subject the optical fiber to a subsequent axial force in a time varying manner, and wherein the subsequent axial force is applied in a manner decreasing with time, to propagate crack growth to cleave the optical fiber.

8. A method of cleaving an optical fiber, comprising:
 scribing an initial crack at the surface of the optical fiber to define a desired cleave location between a first section and a second section of the optical fiber along a length of the optical fiber;

providing a tensioning device, comprising:
  a base;
  a spring bearing including an input, an output, and a spring coupling that couples the output to the input, wherein the output comprises a first coupling structure to fixedly couple thereto the first section of the optical fiber at one side of the crack to prevent axial movement of the first section relative to the output; and
  a frame comprising a second coupling structure to fixedly couple thereto the second section of the optical fiber at another side of the crack to prevent axial movement of the second section relative to the frame,
  wherein an external force applied to the input of the spring bearing causes linear displacement at the output via the spring coupling, creating a linear axial displacement of the first section of the optical fiber with respect to the second section of the optical fiber, to thereby subject the optical fiber to strain and axial force,
  wherein the spring coupling comprises:
    an upper set of at least two parallel fixed-guided beams, and
    a lower set of at least two parallel fixed-guided beams; and
    a top block, an input block and a bottom block, the bottom block being fixed to the base, wherein the upper set of parallel fixed-guided beams is cantilever-coupled to the top block and to the input block, and the lower set of parallel fixed-guided beams are cantilever-coupled to the input block and to the bottom block,
      wherein the input block forms the input of the spring bearing, and the top block is linearly displaceable and forms the output of the spring bearing, and
      wherein the top block comprises the first coupling structure to prevent axial moment of the first section of the optical fiber relative to the top block;

fixedly coupling the first section of the optical fiber at one side of the crack to the top block of the spring bearing using the first coupling structure to prevent axial movement of the first section relative to the output;

fixedly coupling the second section of the optical fiber at another side of the crack to the frame using the second coupling structure to prevent axial movement of the second section relative to the frame, and applying an external force to the input of the spring bearing to cause linear displacement of the top block via the spring coupling, creating a linear displacement of the first section of the optical fiber with respect to the second section of the optical fiber, to thereby subject the optical fiber to strain and axial force.

9. The method as in claim 8, wherein the input block of the spring bearing is linearly displaceable and is subject to linear displacement when the external force is applied, and wherein the spring bearing will continue to subject the optical fiber to axial force when the input is held in place without further displacement of the input block.

10. The method as in claim 8, wherein the external force is initially applied to subject the optical fiber to an initial axial force to initiate crack growth from the initial crack; and, after crack growth is initiated, applying the external force to subject the optical fiber to axial force in a time varying manner, wherein the axial force is applied in a manner decreasing with time, to propagate crack growth to cleave the optical fiber.

11. The method of claim 8, wherein the axial force is applied in a monotonically decreasing manner.

12. The method of claim 8, wherein the axial force is applied in a manner decreasing at a rate that decreases with time.

13. The method of claim 8, wherein the axial force is applied in a manner decreasing with crack growth.

14. The method of claim 13, wherein the axial force is applied in a manner decreasing at a rate that progressively decreases with crack growth.

15. The method of claim 8, wherein the axial force is applied to produce a stress intensity factor for propagating crack on the optical fiber which is maintained substantially constant as the axial force is being reduced.

16. The method of claim 8, wherein each fixed-guided beam comprises a planar spring material.

17. The method of claim 8, wherein the input block is laterally displaceable, and the external force is applied to laterally displace the input block, causing displacement of the top block to subject the optical fiber to strain and stress.

18. The method of claim 17, further comprising a first displacement sensor determining the lateral displacement of the input block.

19. The method of claim 18, further comprising a second displacement sensor determining the lateral displacement of the top block.

20. The method of claim 8, further comprising providing a controller and an actuator, wherein the actuator is operatively connected to the input and to the controller,
  controlling the actuator using the controller to control the input to initially subject the optical fiber to an initial axial force to initiate crack growth from the initial crack, and, after crack growth is initiated, to subject the optical fiber to axial force in a time varying manner, and wherein the axial force is applied in a manner decreasing with time, to propagate crack growth to cleave the optical fiber.

* * * * *